C. P. RANDOLPH.
VEHICLE SPRING.
APPLICATION FILED AUG. 5, 1914.
1,183,233.
Patented May 16, 1916.
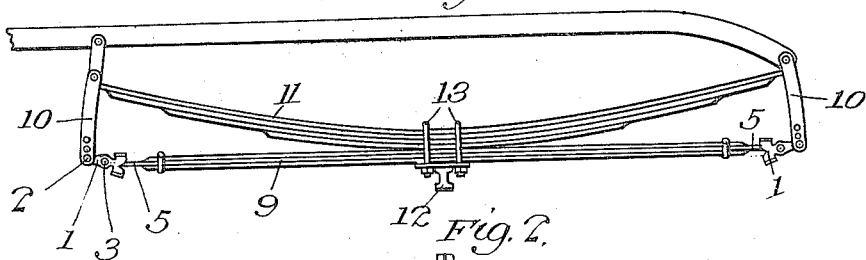
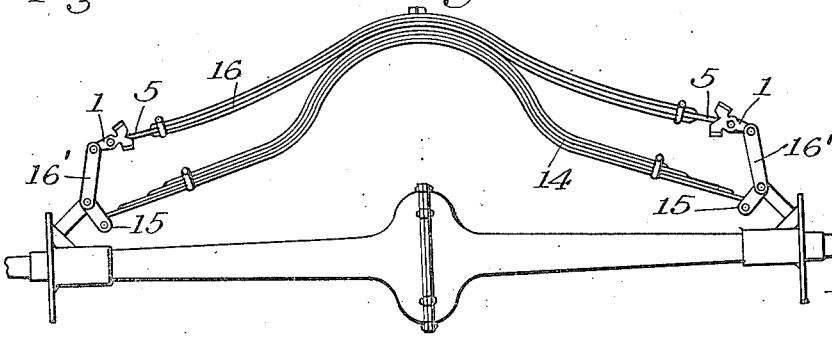
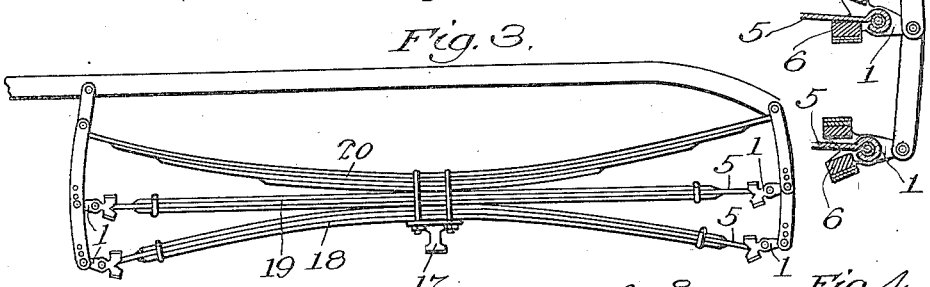
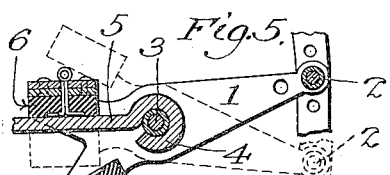 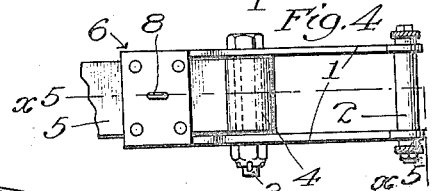
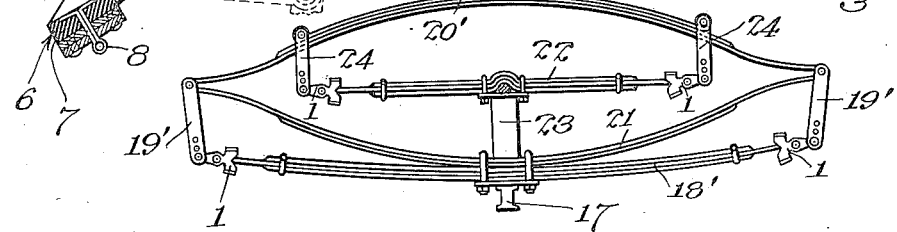
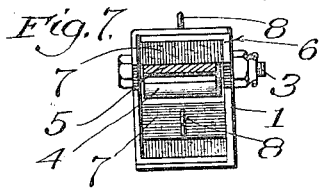
Witnesses:
Inventor:
Clabeorn P. Randolph,
By Lyons Hackley
Attys.

UNITED STATES PATENT OFFICE.

CLABEORN P. RANDOLPH, OF LOS ANGELES, CALIFORNIA.

VEHICLE-SPRING.

1,183,233.  Specification of Letters Patent.  Patented May 16, 1916.

Application filed August 5, 1914.  Serial No. 855,171.

*To all whom it may concern:*

Be it known that I, CLABEORN P. RANDOLPH, a citizen of the United States, residing at Los Angeles, in the county of Los Angeles and State of California, have invented a new and useful Vehicle-Spring, of which the following is a specification.

This invention relates to a vehicle spring designed to cushion the shock in both directions, that is, both upwardly and downwardly.

In carrying out the invention, I provide a connection from the end of the spring which is rigid with the spring for movements in either direction beyond a definite point and between such points the movement of the spring with respect to the connection is flexible.

Referring to the drawings: Figure 1 is a side elevation showing one form. Fig. 2 is a rear elevation showing the device applied to another form of spring. Fig. 3 is a side elevation showing the device applied to another form of spring. Fig. 4 is a plan view on an enlarged scale of the connection and adjacent portion of the spring. Fig. 5 is a section on line $x^5$—$x^5$, Fig. 4. Fig. 6 is a side elevation, showing another form. Fig. 7 is an end elevation of what is shown in Fig. 4. Fig. 8 is an enlarged scale showing the action of the connections on two adjacent springs.

Referring to Fig. 5, 1 designates a connection which is pivoted at 2, and is provided with a pin 3, to which is pivotally secured the eye 4 of a spring leaf 5. The connection 1 has two abutments 6, which are adapted to strike the spring leaf after a certain definite angular movement takes place. These abutments may be provided with rubber pads 7 secured in any desired manner as by the pins 8 in order to retain the sound. The abutments 6 are opposed and lie over and under the spring leaf 5.

In the form shown in Fig. 1, the connections are arranged at each end of lower spring 9, and the connections are pivoted to hangers 10. 11 is an upper bowed spring. 12 is the axle, and 13 are clips securing the springs 9 and 11 to the axle. As the body moves down, the connections will pivot at 3 until their lower abutments 6 strike under the leaf 5, whereupon the connection will become rigid with the leaf 5 and lower spring 9, and the further downward movement will be resisted by the lower spring 9. On the rebound the upward movement of the pivotal points 2 acting around the pivots 3 will swing the connections 1 until the upper abutments strike the upper side of the leaf 5 which will then cause the lower spring to act to check the extreme upper portion of the rebound. The ordinary spring movement therefore will be taken care of by the spring 11, and the shock will be absorbed by the spring 9 both upwardly and downwardly. The same principle may be applied to the form of spring shown in Fig. 2, in which the lower spring 14 is connected to hangers 15, and the upper spring 16 is provided with the connections 1, which are supported on rock arms 16'. In this form, the upper spring will be caused to act as soon as the connections have been tilted enough to bring their upper or lower abutments, as the case may be, against the leaf 5.

In Fig. 3, 17 is an axle upon which rests a lower bowed spring 18 and center spring 19 and an upper bowed spring 20. In this form, the springs 18 and 19 are provided with the connections 1 and come into operation consecutively. Thus, during the downward movement of the body, the first spring to cushion the shock is spring 19, as shown in Fig. 8, the leaf 5 of which is engaged by the abutment 6, while further downward movement will bring the abutment 6 of the lower connection into operative relation with the lower spring 18. Thus, for lighter shocks only the spring 19 will operate, and for extremely heavy shocks spring 18 will be brought into action. During the reverse or upward rebound of the body, the upper connection 1 will first engage the center spring 19, and as the upward movement continues the lower connection will come into rigid relation with the lower spring 18.

In the form shown in Fig. 6, 17 is the axle upon which rests a bowed spring 18' with connections 1 connected to hangers 19'. Hangers 19' in turn are connected to bowed springs 20' and 21, spring 21 being mounted on axle 17. An intermediate spring 22 is mounted on a support 23 between the springs 20' and 21 and hangers 24 depend from the spring 20' and connect by connections 1 with the spring 22. In this form the action is also consecutive, the spring 18' first coming into operation, on account of the longer sweep of the hangers 19' which are at the end thereof and spring 22 coming into action secondly. During the rebound the action is the same. The long spring 18' first comes into action, and then the short spring 22. The ordinary spring movements are taken by the springs 20 and 21.

While I have shown several forms of my invention, it should be understood that the device is capable of being arranged in a great many different relations with springs.

One of the greatest advantages of the invention is that it gives full and perfect resiliency for all loads. Thus for a light load the upper set of springs is brought into play only and it acts without hindrance of the other set and thus its liveliness is not deadened. When a heavier load is carried the lower set is brought into action and contributes the further necessary carrying power, giving this with complete elasticity so that for all loads the springs automatically come into use in proportion to the weight to be borne.

What I claim is:

1. The combination with a vehicle body, of a supporting spring connected with the body, a cushioning spring connected intermediate its ends with the supporting spring, hangers connected with the supporting spring, connections pivoted to the hangers and to the ends of the cushioning spring, and abutments carried by the hangers and lying over and under the cushioning spring, said abutments adapted to engage said cushioning spring whereby the cushioning spring will assume a rigid relation with the connection and be brought into action.

2. The combination with a vehicle body, of a supporting spring connected with the body, a plurality of cushioning springs, hangers connected with the supporting spring, connections pivotally connected to the respective cushioning springs, and to the hangers, abutments carried by the connections and located above and under the respective cushioning springs, said abutments allowing a certain limited angular movement of the connections with respect to their respective cushioning springs and bringing said connections into rigid relation with the cushioning springs, the abutments of the connections for one spring coming into action sooner than those of the other spring whereby the cushioning springs act consecutively.

3. The combination with a vehicle body, of a supporting spring connected to the body, a cushioning spring connected with the supporting spring, hangers connected to the supporting spring, a connection pivoted at one end to each of the hangers and intermediate its ends to the cushioning spring, and lateral offset abutments carried at the other end of each of the hangers and being located over and beneath the cushioning spring.

In testimony whereof, I have hereunto set my hand at Los Angeles, California, this 31st day of July, 1914.

CLABEORN P. RANDOLPH.

In presence of—
GEO. T. HACKLEY,
LORRAINE E. DURROW.